(12) United States Patent
Oberlander et al.

(10) Patent No.: US 6,517,173 B1
(45) Date of Patent: Feb. 11, 2003

(54) ENDLESS TRACK SYSTEM

(76) Inventors: Jack Oberlander, 1801-23rd Ave. North, Fargo, ND (US) 58102; Peter Christianson, 6959 Riverdale Dr., Fargo, ND (US) 58104

( * ) Notice: Subject to any disclaimer, the term of this patent is extended or adjusted under 35 U.S.C. 154(b) by 0 days.

(21) Appl. No.: 09/627,648

(22) Filed: Jul. 28, 2000

Related U.S. Application Data
(60) Provisional application No. 60/170,846, filed on Dec. 14, 1999.

(51) Int. Cl.[7] ............................................. B62D 55/28
(52) U.S. Cl. ...................................... 305/180; 305/152
(58) Field of Search ................................ 305/180, 157, 305/158, 165, 167, 178, 160, 161, 162, 169, 182

(56) References Cited

U.S. PATENT DOCUMENTS

| | | | | |
|---|---|---|---|---|
| 1,814,046 A | * | 7/1931 | Kegresse | 305/180 |
| 3,250,577 A | * | 5/1966 | Olson | 305/158 |
| 3,802,751 A | * | 4/1974 | Beyers | 305/38 |
| T980,007 I4 | * | 3/1979 | Lammers | 305/58 R |
| 4,165,906 A | * | 8/1979 | Fix | 305/499 |
| 4,615,567 A | * | 10/1986 | Wohlford et al. | 305/40 |
| 4,642,080 A | * | 2/1987 | Takano et al. | 305/180 |
| 4,995,678 A | * | 2/1991 | Jinkens | 305/58 R |
| 5,058,963 A | * | 10/1991 | Wiesner et al. | 305/158 |
| 5,690,398 A | * | 11/1997 | Pribyl | 305/162 |
| 6,267,453 B1 | * | 7/2001 | Deland | 301/113 |

* cited by examiner

*Primary Examiner*—S. Joseph Morano
*Assistant Examiner*—Frantz F. Jules
(74) *Attorney, Agent, or Firm*—Michael S. Neustel

(57) ABSTRACT

An endless track system for providing a plurality of rigid grouser members attached about the exterior surface of a rubber track. The inventive device includes an endless rubber track having an outer surface and an inner surface, a plurality of gripping members attached to the outer surface of the endless track, and a plurality of inner members attached to the inner surface of the endless track and to the gripping members. Each of the inner members is comprised of an elongate support member with a pair of opposing side walls attached orthogonally to. The gripping members are preferably comprised of a center member surrounded by an outer coating. The outer coating may be comprised of any plastic or rubber material for reducing damage to surfaces traveled upon. The gripping members are preferably attached to the inner members by a plurality of fasteners that extend through the endless rubber track. In an alternative embodiment, the gripping members may be comprised of a member having a U-shaped cross sectional area.

15 Claims, 15 Drawing Sheets

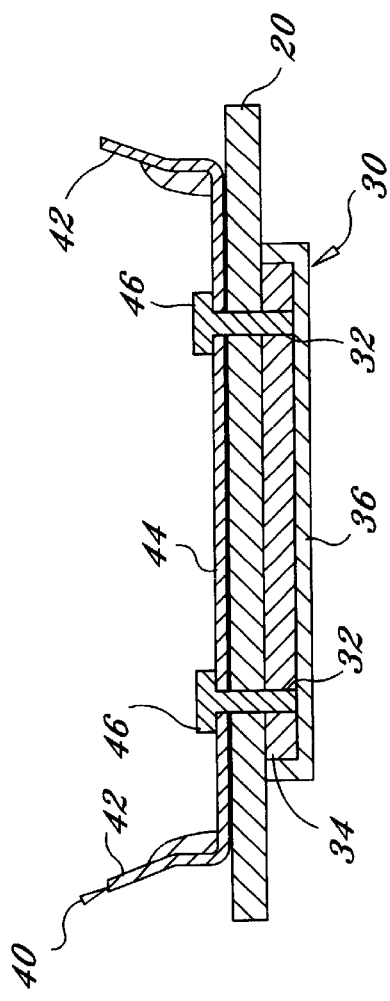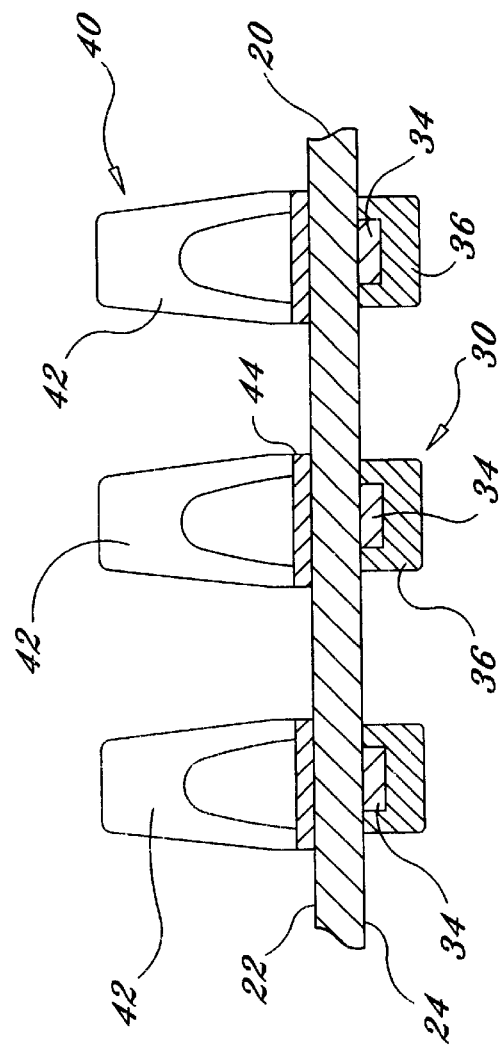

ENDLESS TRACK SYSTEM

CROSS-REFERENCE TO RELATED U.S. PATENT APPLICATION

I hereby claim benefit under Title 35, United States Code, Section 119(e) of U.S. provisional patent application Ser. No. 60/170,846 filed Dec. 14, 1999 entitled "Endless Track System". This application is a continuation-in-part of the No. 60/170,846 application. The No. 60/170,846 application is currently pending.

BACKGROUND OF THE INVENTION

1. Field of the Invention

The present invention relates generally to rubber endless tracks positionable about the wheels of a tractor and more specifically it relates to an endless track system for providing a plurality of rigid grouser members attached about the exterior surface of a rubber track.

Tractor devices known as skid-steer loaders are common amongst agricultural and commercial businesses. A popular brand of skid-steer loaders is the MELROE BOBCAT. Often times the owner of the skid-steer loader will position two rubber endless tracks about the front and rear wheels of the skid-steer loader to increase traction and floatation within light soil. However, rubber endless tracks are susceptible to wear during extended periods of use. In addition, rubber endless tracks do not provide rigid traction bars or rigid alignment members that are desired by the users. Hence, there is a need for an endless rubber track with a plurality of rigid traction members.

2. Description of the Prior Art

Rubber endless tracks have been in use for years. Typically, the rubber endless track is comprised of a solid loop of rubber track with a plurality of rubber gripping segments molded directly into the track. Because the rubber gripping segments are molded directly into the track, it is very difficult to provide gripping segments that are rigid as is desired. In addition, when the gripping segments become worn the entire rubber track must be replaced.

Examples of attempted endless tracks include U.S. Pat. No. EP-270-237 to Cartwright et al.; U.S. Pat. No. 2,887,343 to West; U.S. Pat. No. 3,801,164 to Mazzarins; U.S. Pat. No. 5,894,900 to Yamamoto et al.; U.S. Pat. No. 4,810,043 to McIntosh; U.S. Pat. No. 5,616,193 to Nordstrom et al.; U.S. Pat. No. 3,276,823 to Tucker, Jr.; U.S. Pat. No. 3,239,021 to Harvey which are all illustrative of such prior art.

While these devices may be suitable for the particular purpose to which they address, they are not as suitable for providing a plurality of rigid grouser members attached about the exterior surface of a rubber track. Conventional rubber tracks utilized gripping segments that are molded directly into the rubber endless track which easily become worn over time. In addition, conventional rubber tracks for tractors often times run off the wheels of the tractor during use.

In these respects, the endless track system according to the present invention substantially departs from the conventional concepts and designs of the prior art, and in so doing provides an apparatus primarily developed for the purpose of providing a plurality of rigid grouser members attached about the exterior surface of a rubber track.

SUMMARY OF THE INVENTION

In view of the foregoing disadvantages inherent in the known types of rubber endless tracks now present in the prior art, the present invention provides a new endless track system construction wherein the same can be utilized for providing a plurality of rigid grouser members attached about the exterior surface of a rubber track.

The general purpose of the present invention, which will be described subsequently in greater detail, is to provide a new endless track system that has many of the advantages of the rubber endless tracks mentioned heretofore and many novel features that result in a new endless track system which is not anticipated, rendered obvious, suggested, or even implied by any of the prior art rubber endless tracks, either alone or in any combination thereof.

To attain this, the present invention generally comprises an endless rubber track having an outer surface and an inner surface, a plurality of gripping members attached to the outer surface of the endless track, and a plurality of inner members attached to the inner surface of the endless track and to the gripping members. Each of the inner members includes an elongate support member with a pair of opposing side walls attached orthogonally to. The gripping members are preferably comprised of a center member surrounded by an outer coating. The outer coating may be comprised of any well-known plastic or rubber material for reducing damage to surfaces traveled upon. The gripping members are preferably attached to the inner members by a plurality of fasteners that extend through the endless rubber track. In an alternative embodiment, the gripping members may be comprised of a member having a U-shaped cross sectional area.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an endless track system that will overcome the shortcomings of the prior art devices.

Another object is to provide an endless track system that includes a plurality of rigid traction members upon a rubber track.

A further object is to provide an endless track system that is easily attached about a pair of tires upon a tractor without requiring removal of the tires.

Another object is to provide an endless track system that operates looser about the wheels of a tractor than conventional rubber tracks thereby extending the useful life.

An additional object is to provide an endless track system that includes a plurality of rigid traction bars that can be replaced when worn.

A further object is to provide an endless track system that combines the advantages of rubber endless tracks with the advantages of rigid metal tracks.

Another object is to provide an endless track system that increases the useful life of a rubber endless track.

An additional object is to provide an endless track system that reduces tire slippage and the tires driving off the endless track.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 11 is a cross sectional view taken along line 11—11 of FIG. 6 showing the connection of the gripping member to the inner member about the endless rubber track.

FIG. 12 is a side cutaway view of the present invention.

DESCRIPTION OF THE PREFERRED EMBODIMENT

Figure 1:
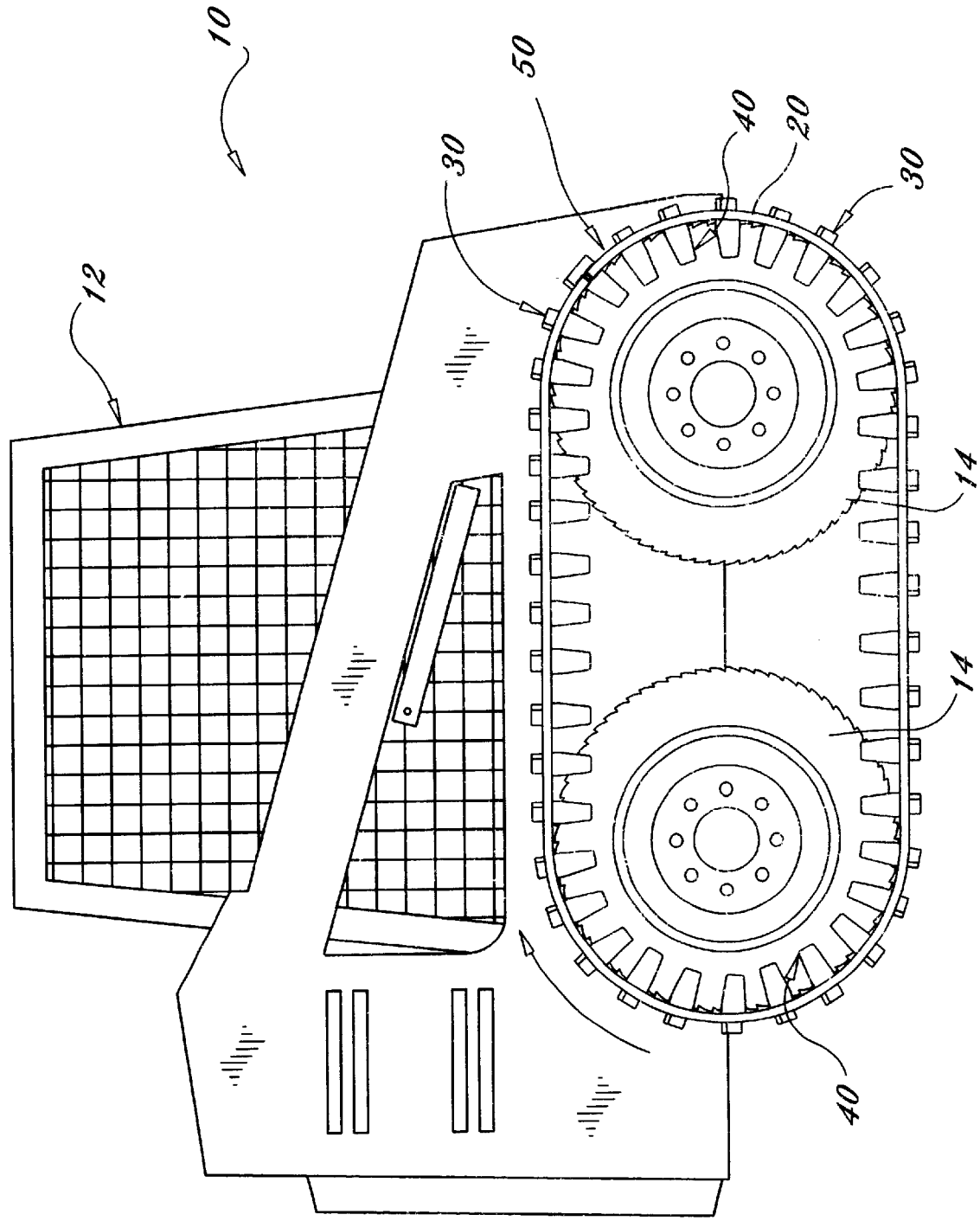
FIG. 1 is a side view of the present invention attached about a pair of tires upon a skid-steer tractor.

Turning now descriptively to the drawings, in which similar reference characters denote similar elements throughout the several views, FIGS. 1 through 14 illustrate an endless track system 10, which comprises an endless rubber track 20 having an outer surface 24 and an inner surface 22, a plurality of gripping members 30 attached to the outer surface 24 of the endless track 20, and a plurality of inner members 40 attached to the inner surface 22 of the endless track and to the gripping members 30. Each of the inner members 40 includes an elongate support member 44 with a pair of opposing side walls 42 attached orthogonally to. The gripping members 30 are preferably comprised of a center member 34 surrounded by an outer coating 36. The outer coating 36 may be comprised of any well-known plastic or rubber material for reducing damage to surfaces traveled upon and for reducing wear upon the endless track 20. The gripping members 30 are preferably attached to the inner members 40 by a plurality of fasteners 46 that extend through the endless rubber track 20. In an alternative embodiment, the gripping members 30 may be comprised of a member having a U-shaped cross sectional area.

The structure and usage of an endless rubber track 20 is well known in the art. Conventional rubber tracks 20 are comprised of a solid rubber material formed about belting to increase the strength and for preventing stretching of the rubber tracks. The endless rubber track 20 is constructed of any well known rubber material capable of constructing an endless rubber track 20.

Figure 9:
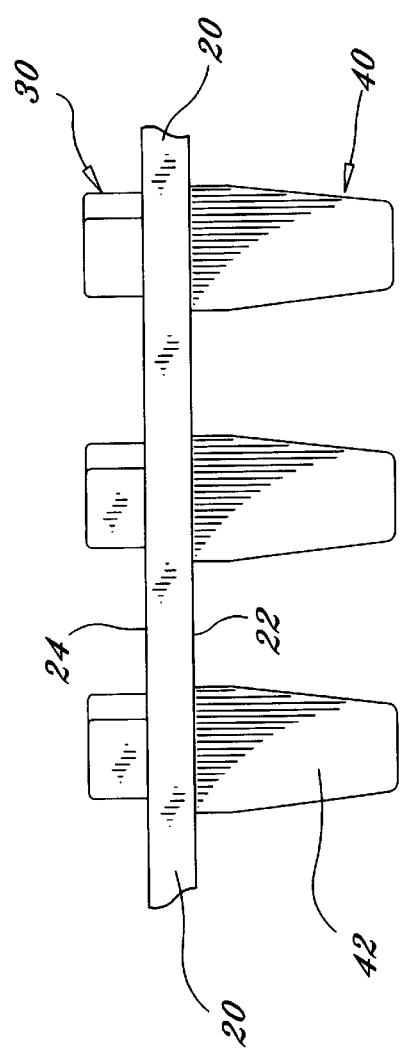
FIG. 9 is a Partial side view of the present invention.

The endless rubber track 20 has both an inner surface 22 and an outer surface 24 as best shown in FIG. 9 of the drawings. The endless rubber track 20 is formed in a loop structure so that it is positionable about a front tire and a rear tire 14 of a tractor 12. The endless rubber track 20 may be constructed of a solid loop or the endless rubber track 20 may have opposing ends that are attachable to one another by a connecting structure 50.

It can also be appreciated that the endless rubber track 20 may include a plurality of openings within. There are various designs and structures of rubber tracks 20 that are well-known in the art. Hence, there will be no further discussion regarding the structure and design of the endless rubber track 20.

As shown in FIGS. 1 through 5 of the drawings, a plurality of gripping members 30 are positioned about the outer surface 24 of the endless rubber track 20. The gripping members 30 may be attached directly to the endless rubber track 20. The gripping members 30 are preferably attached to the inner members 40 by a plurality of fasteners 46 that extend through the inner members 40 to the gripping members 30. A plurality of threaded apertures positioned within the gripping members 30 receive the fasteners 46 as shown in FIG. 11 of the drawings.

Figure 14:
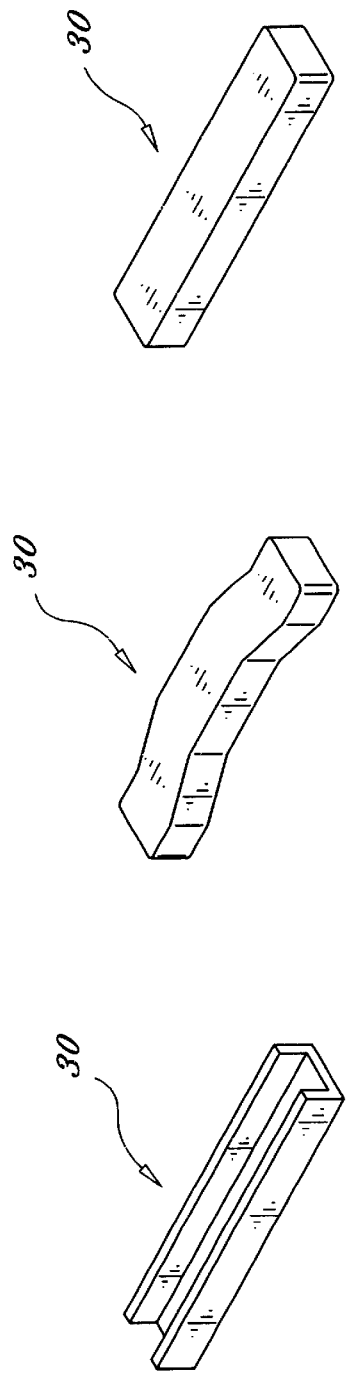
FIG. 14 is an upper perspective view of the various types of gripping members that may be utilized.
Figure 15:
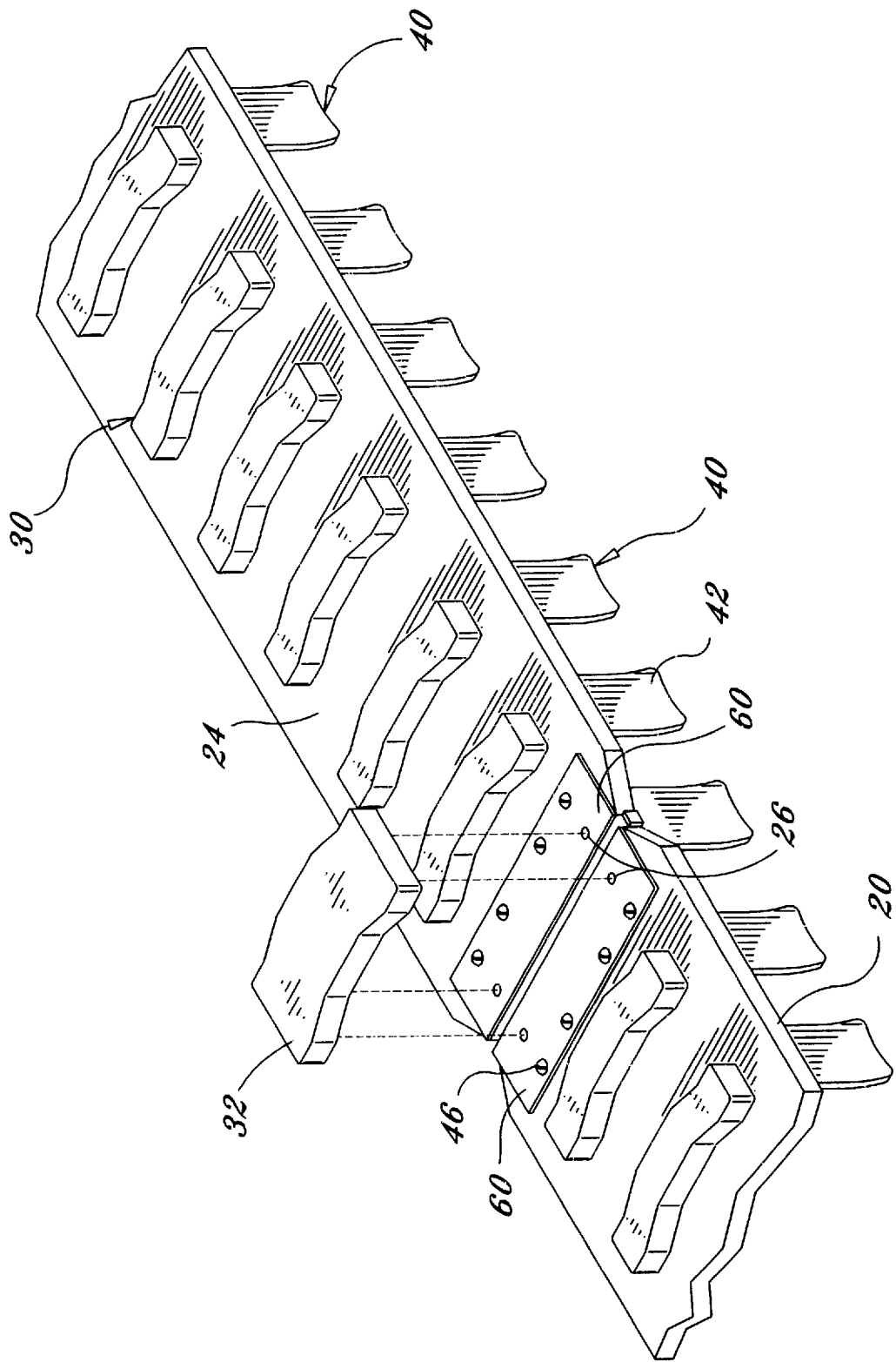
FIG. 15 is an exploded upper perspective view of an alternative embodiment of the present invention showing the upper plates.
Figure 16:
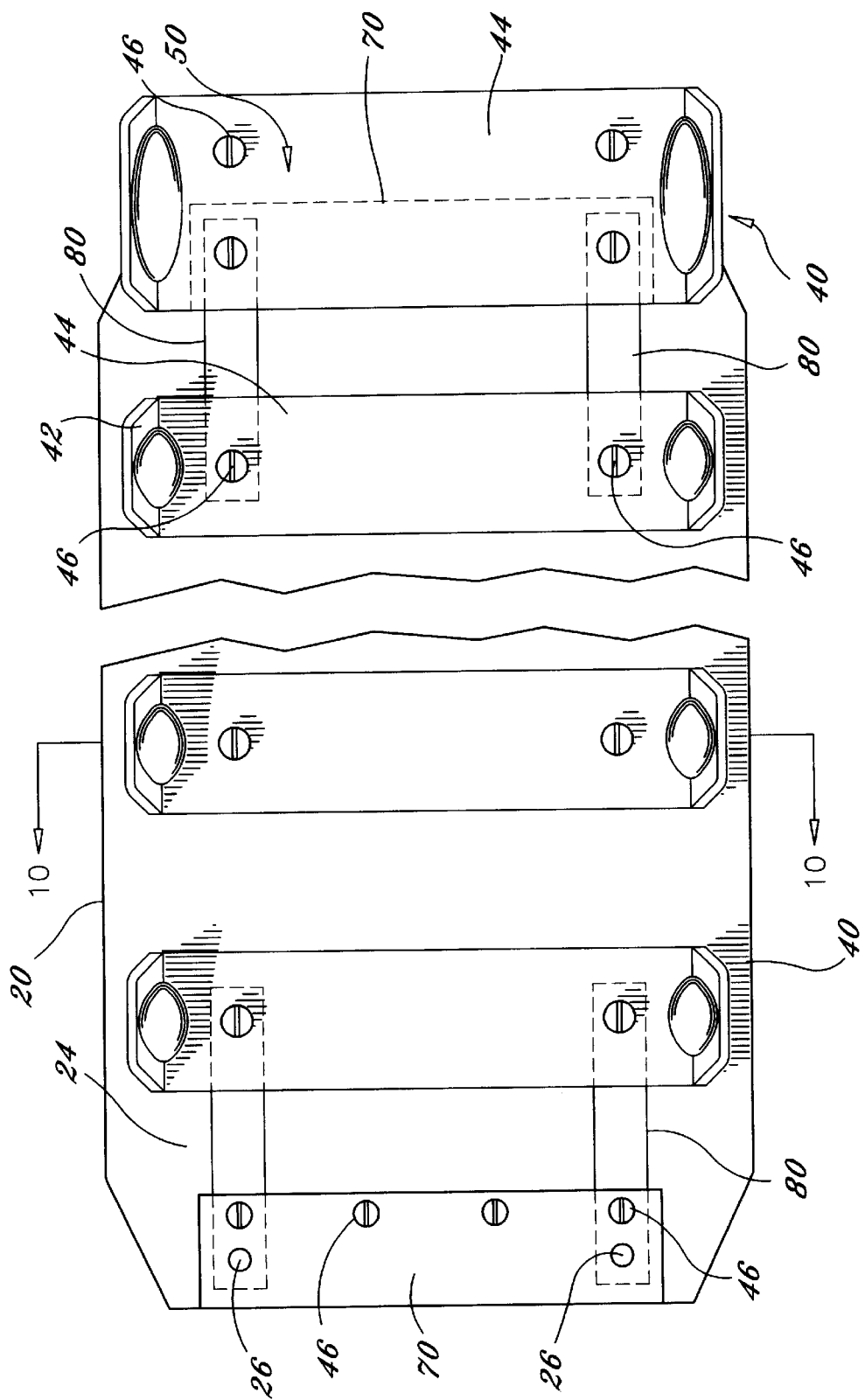
FIG. 16 is a bottom view of the alternative embodiment.
Figure 17:
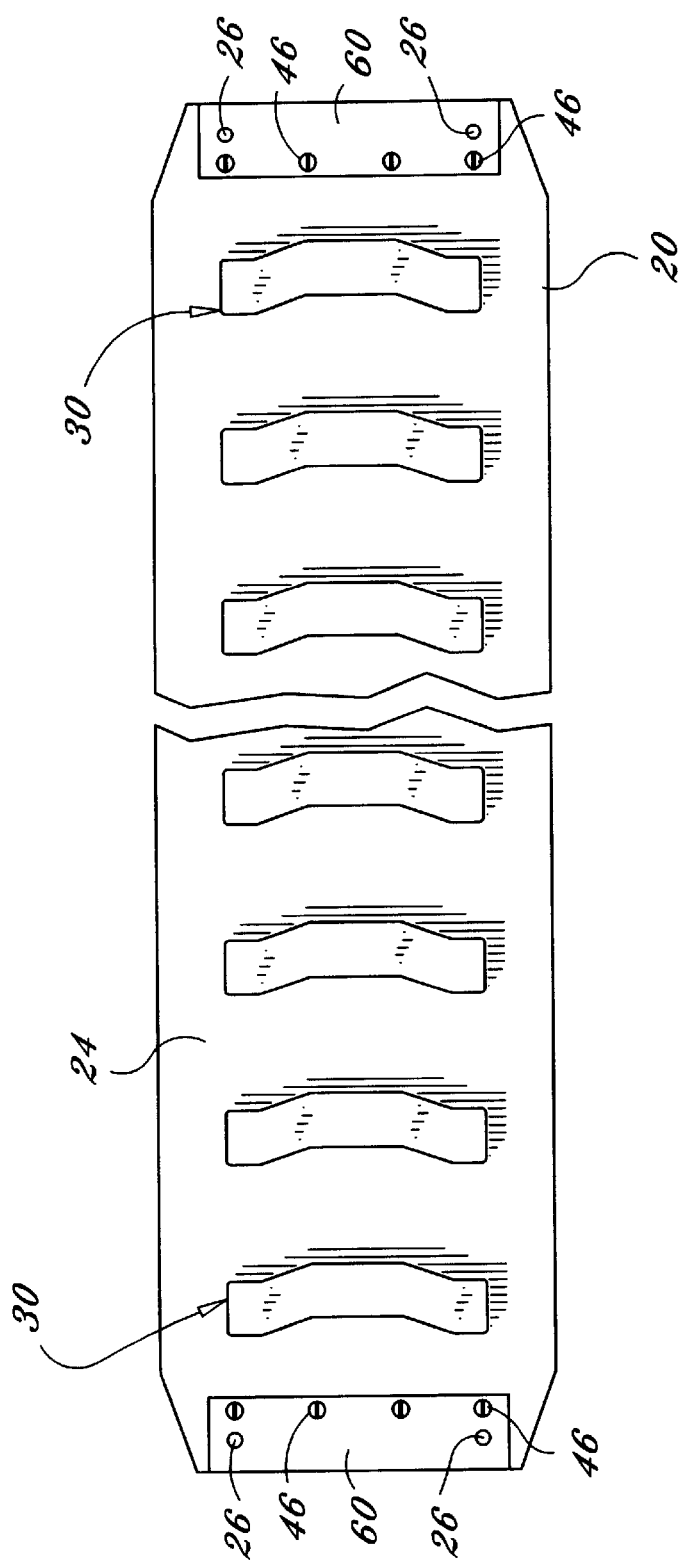
FIG. 17 is top view of the alternative embodiment.
Figure 18:
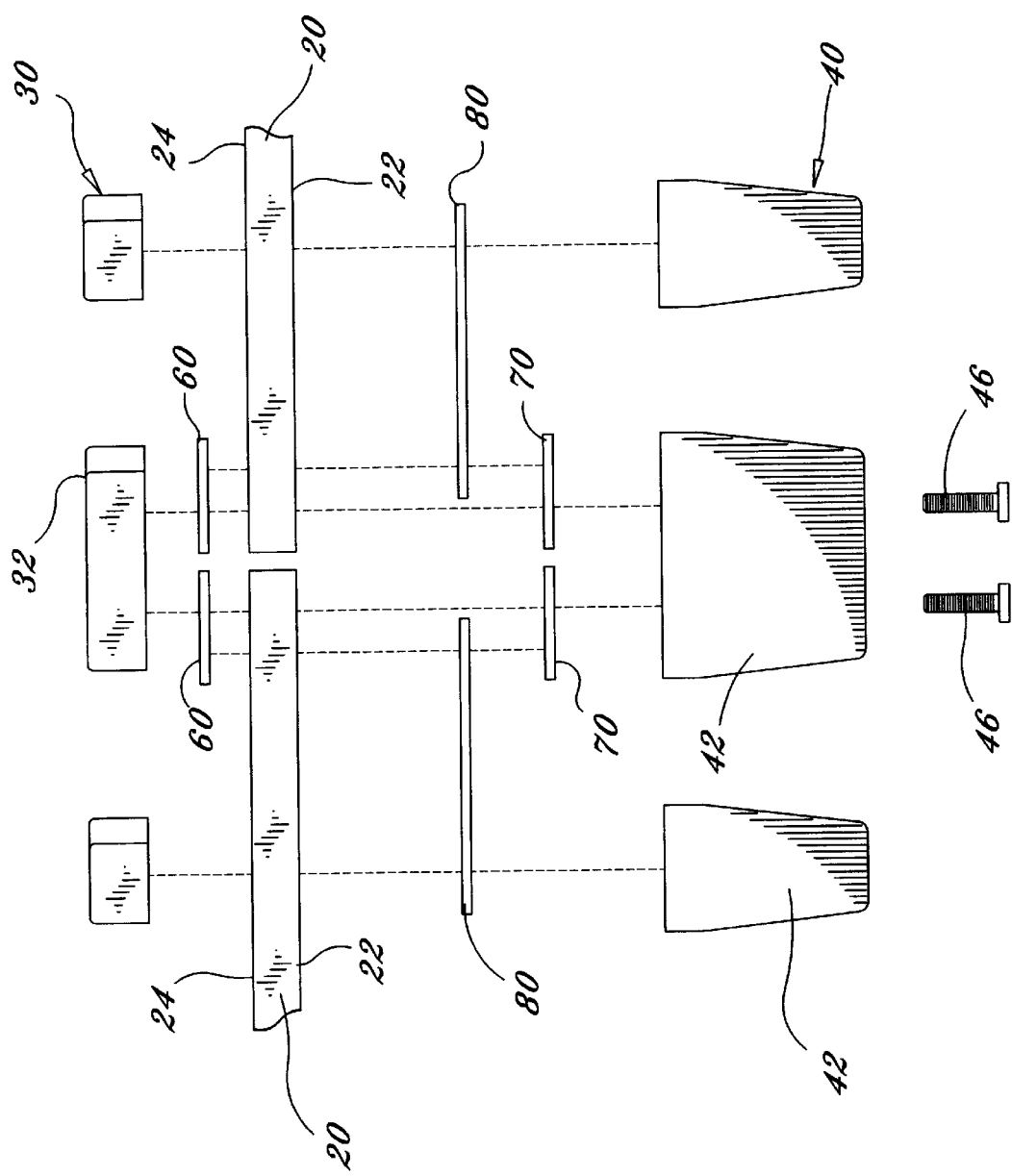
FIG. 18 is a side exploded view of the present invention.

The gripping members 30 may have various shapes, designs and structures as shown in FIG. 14 of the drawings. The gripping members 30 are preferably comprised of a solid structure as shown in FIGS. 1 through 5 of the drawings. As best shown in FIG. 11 of the drawings, the gripping members preferably include a rigid center member 34 surrounded by a resilient outer coating 36 such as rubber or plastic. The center member 34 is preferably constructed of a rigid material such as steel. The outer coating 36 is preferably comprised of a hardened plastic or rubber material that is attached about the center member 34 through a conventional means such as molding.

The gripping members 30 may extend from or past the opposing edges of the endless rubber track 20. It is preferable that the gripping members 30 are shorter than he width of the endless rubber track 20 for allowing the endless rubber track 20 to "ride up" over top of a soft ground surface when the tractor 12 is sliding sideways thereby preventing the edge of the endless rubber track 20 from digging into the ground surface.

As best shown in FIGS. 2 through 5 of the drawings, the gripping members 30 preferably are aligned traversely with respect to the endless rubber track 20. In addition, the gripping members 30 are each preferably formed with a center portion and a pair of opposing end portions. As further shown in FIGS. 2 through 5 of the drawings, the center portion of the gripping members 30 is substantially traverse with respect to the endless rubber track 20 and the opposing end portions are at an angle with respect to the center portion. The opposing end portions of the gripping members 30 preferably are angled rearwardly with respect to the travel of the endless belt. The angled opposing end portions of the gripping members 30 significantly reduces sideways movements of the endless track system 10 upon a ground surface compared to a straight gripping member 30.

It can be appreciated that the gripping members 30 may be comprised of a solid material such as plastic or rubber, however the center member 34 increases the strength for receiving the fasteners 46 from the inner members 40 while the outer coating 36 maintains a soft and resilient surface which does not damage a floor surface such as concrete or asphalt. The gripping members 30 can also be constructed of a solid material such as metal. In an alternative embodiment shown in FIG. 14 of the drawings, the gripping members 30 may comprised of an elongate metal bar that has a U-shaped cross-sectional area.

Figure 10:
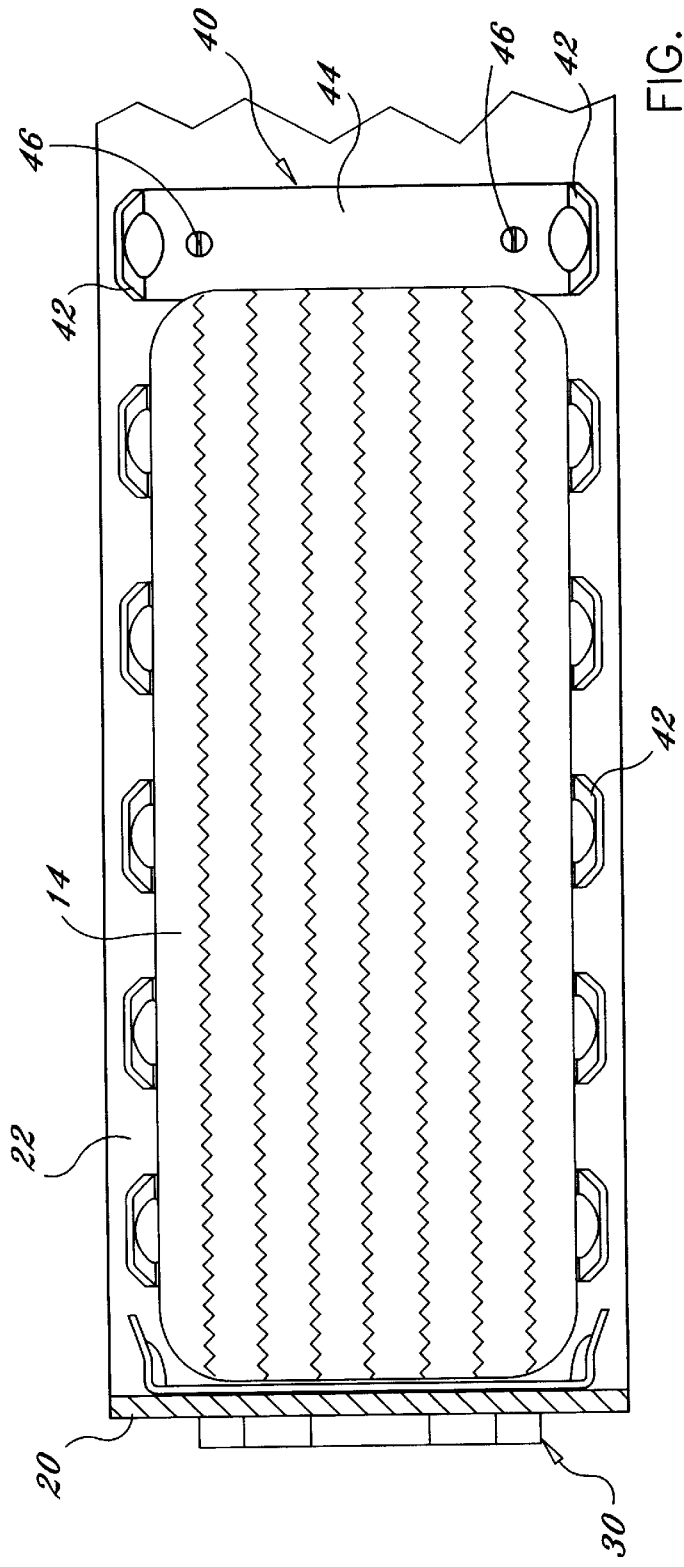
FIG. 10 is a cutaway top view of a tire within the inner surface of the endless rubber track.
Figure 13:
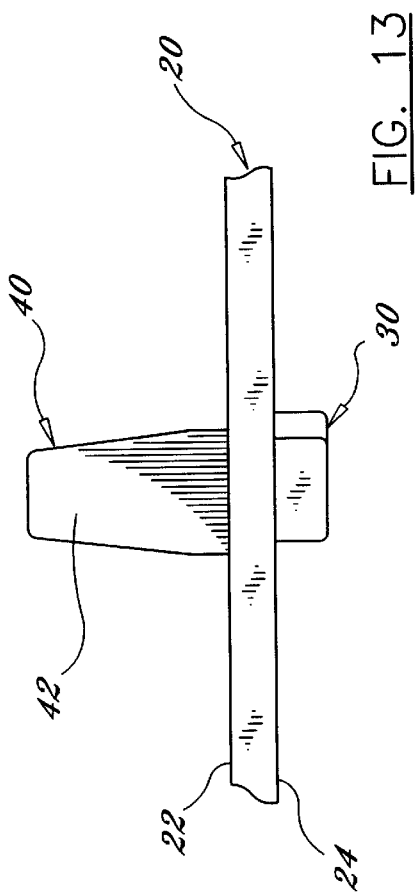
FIG. 13 is a side view of the present invention.

The inner members 40 are positioned about the inner surface 22 of the endless rubber track 20 in opposition to each of the plurality of gripping members 30. The inner members 40 are comprised of a rigid support member 44 with a pair of opposing side walls 42 attached to the opposing ends of the support member 44 forming a U-shaped structure for securing receiving the tire 14 of the tractor 12 as best shown in FIG. 10 of the drawings. The side walls 42 may have any well-known shape and preferably angle outwardly at a slight angle and slightly rounded to prevent damage to the wheels 14 of the skid-steer tractor 12.

The inner members 40 are attached to the gripping members 30 by the plurality of fasteners 46 extending through the endless rubber track 20 from the gripping members 30 as best shown in FIG. 11 of the drawings. The wheels of the skid-steer tractor 12 travel within the U-shaped channel created by the plurality of inner members 40 while being retained within the endless rubber track 20 by the rigid side walls 42. The support member 44 is preferably wider than the gripping members 30 to help prevent debris from entering between the gripping members 30 and the endless rubber track 20.

Figure 2:
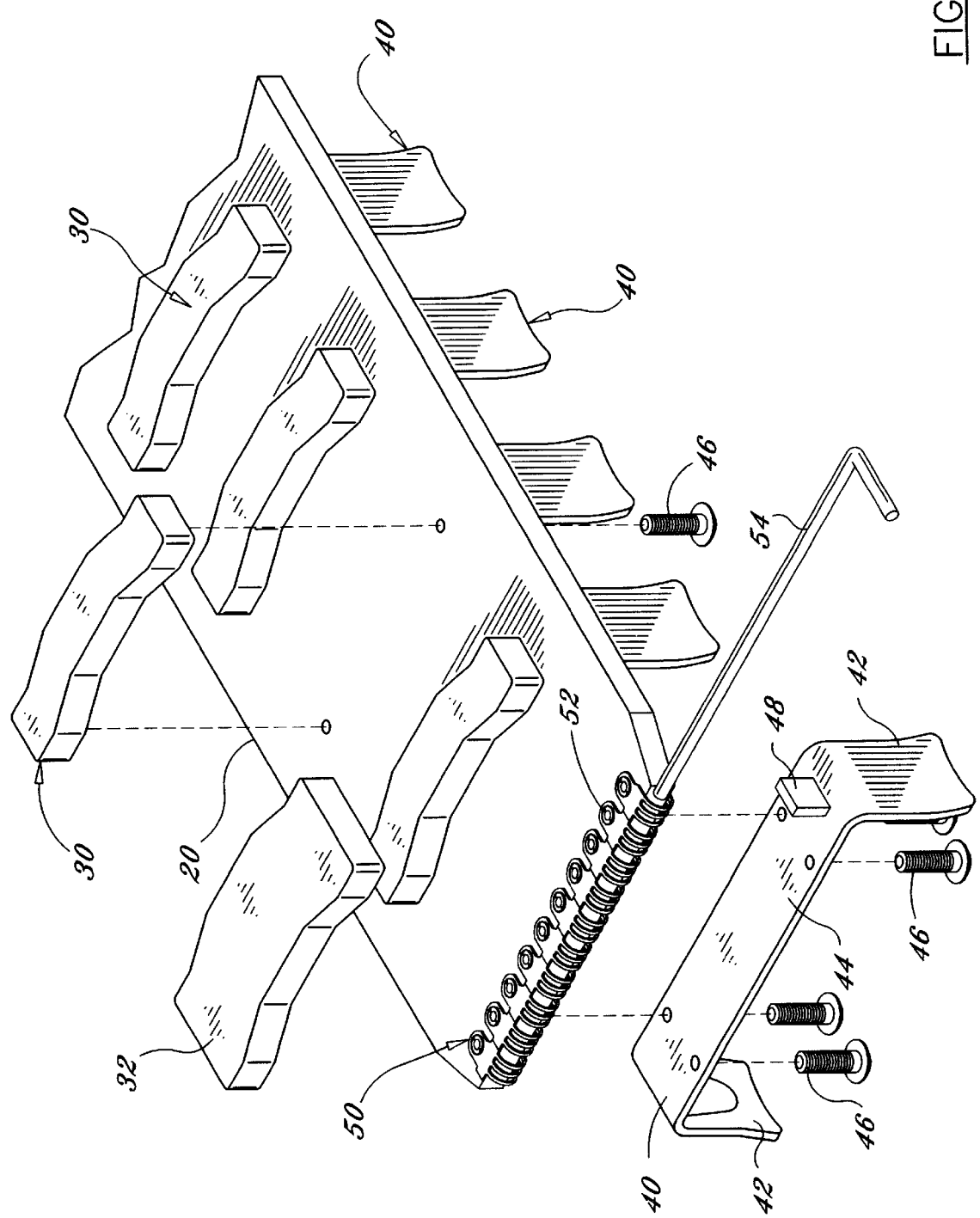
FIG. 2 is an exploded upper perspective view of the connecting structure of the present invention.
Figure 3:
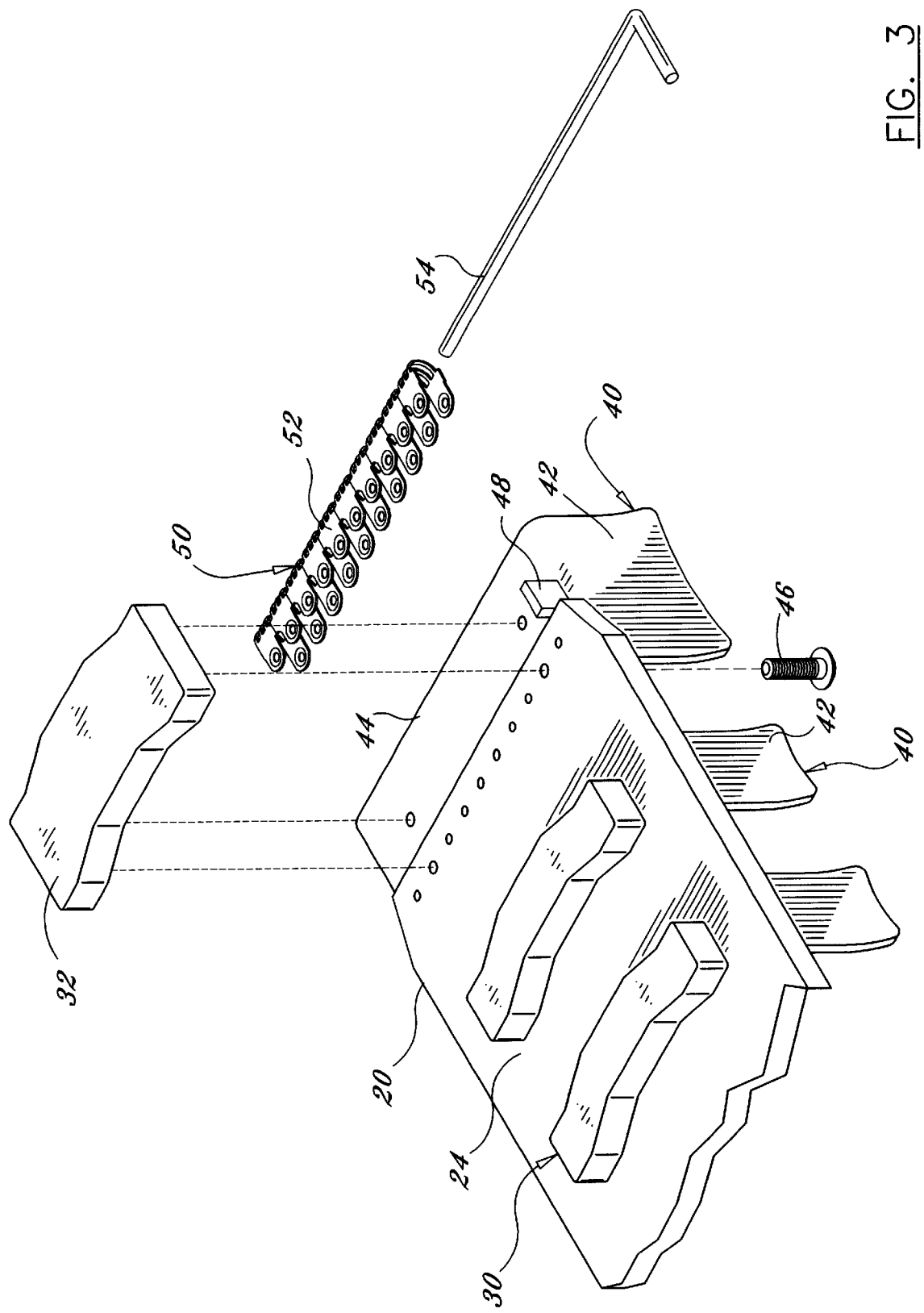
FIG. 3 is an exploded upper perspective view of the connecting structure of the present invention.
Figure 4:
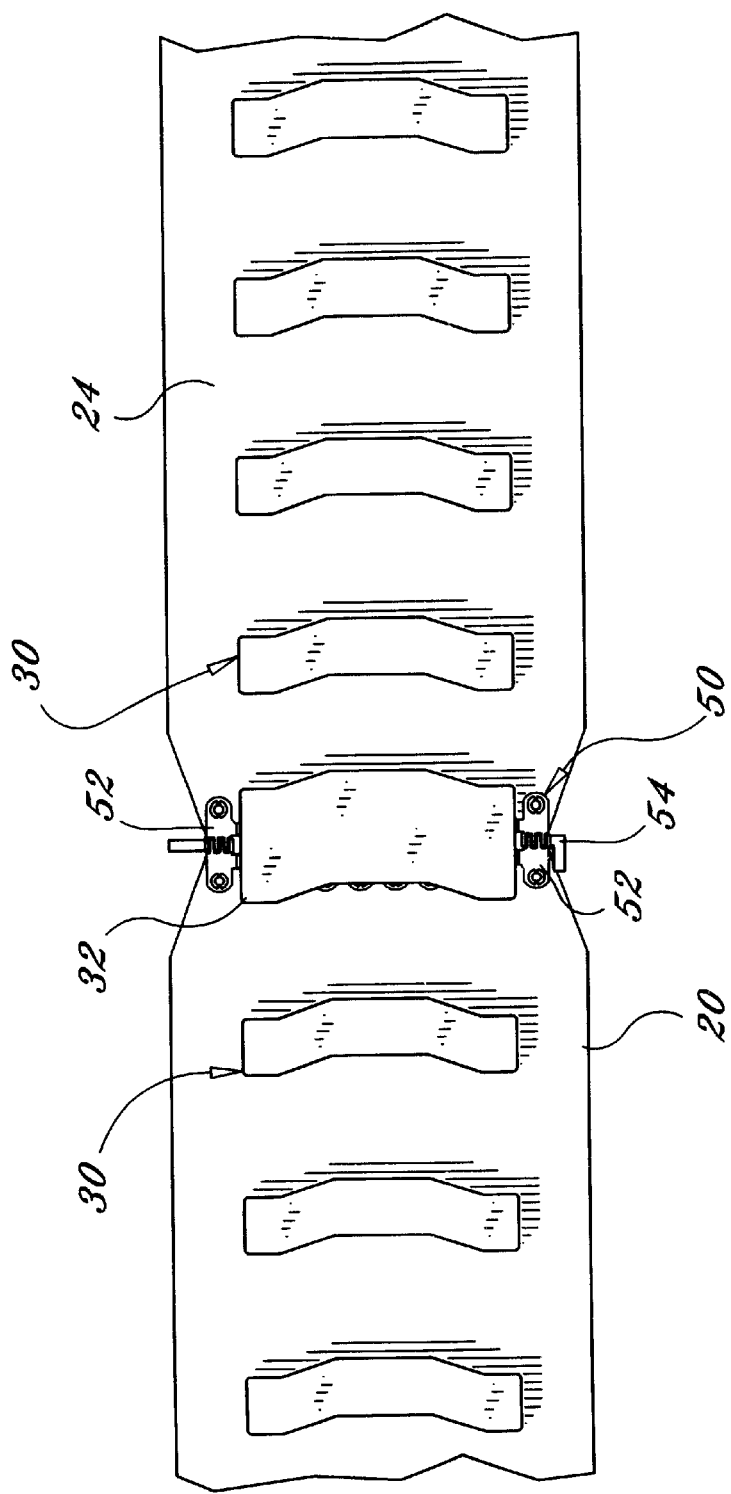
FIG. 4 is a top view of the endless rubber track with the distal ends attached.
Figure 5:
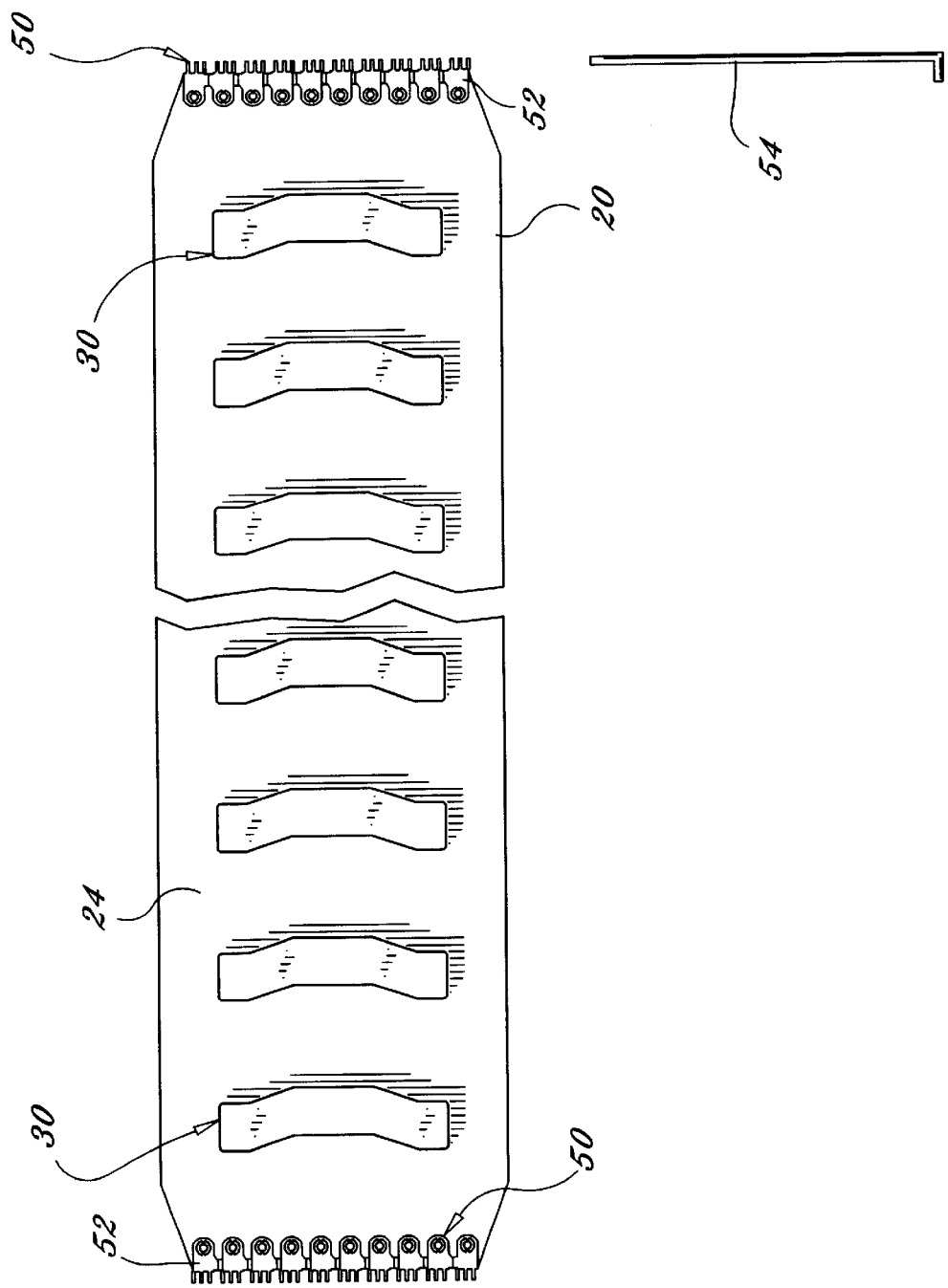
FIG. 5 is a top view of the endless rubber track with the distal ends separated.

As shown in FIGS. 2 through 6 of the drawings, the connecting structure 50 is comprised of a plurality of brackets 52 attached to the distal ends of the endless rubber track 20. The plurality of brackets 52 may be attached to the endless rubber track 20 with any well known fastener 46 or other attachment means. The brackets are each formed into a semi-loop structure that overlap one another from the opposing distal end of the endless rubber track 20 for receiving the connecting shaft 54. The connecting shaft 54 is a rigid elongated member that is extendible within the plurality of brackets 52 for retaining the distal ends of the endless rubber track 20 within a juxtaposed position as shown in FIG. 4 of the drawings. The connecting shaft 54 preferably has a bend or flanged end portion for preventing the connecting shaft 54 from extending through the brackets 52. A locking member 48 extending from one of the inner members 40 prevents the connecting shaft from being accidentally removed from the within the brackets 52 during operation of the endless track system 10.

Figure 6:
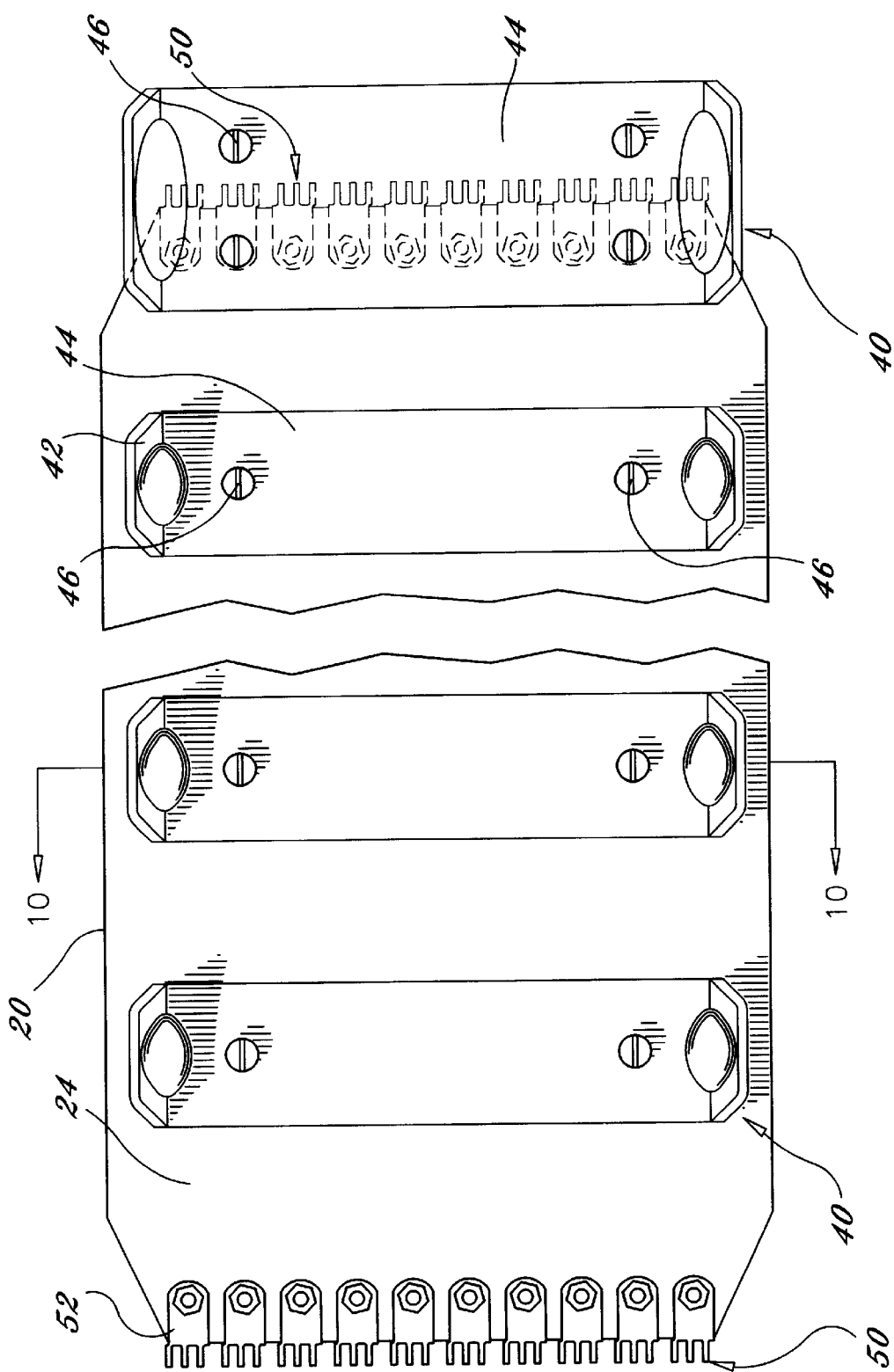
FIG. 6 is a top view of the inside surface and the inner members of the endless rubber track.
Figure 7:
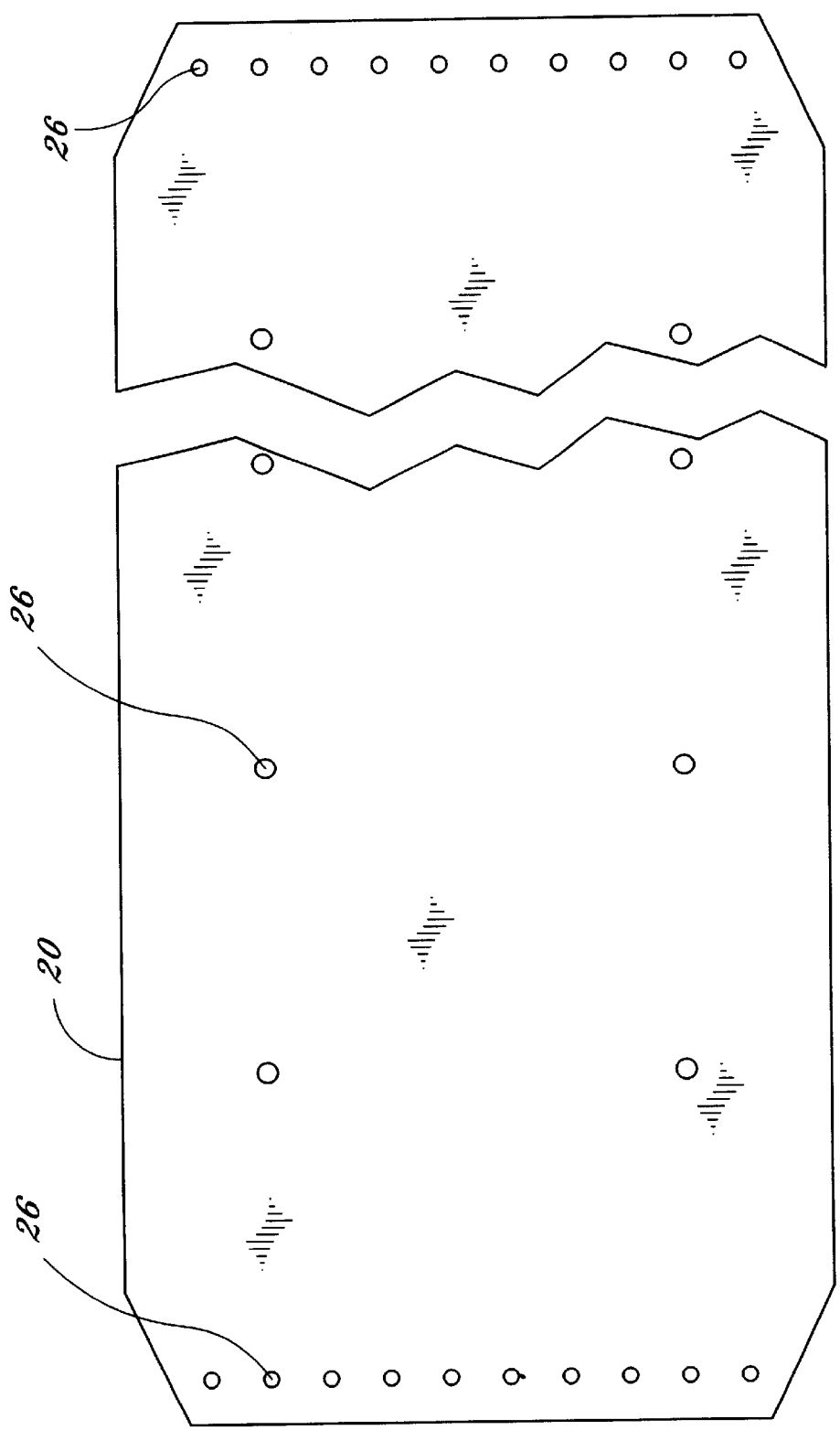
FIG. 7 is a top view of the endless rubber belt without any inner members or gripping members attached.
Figure 8:
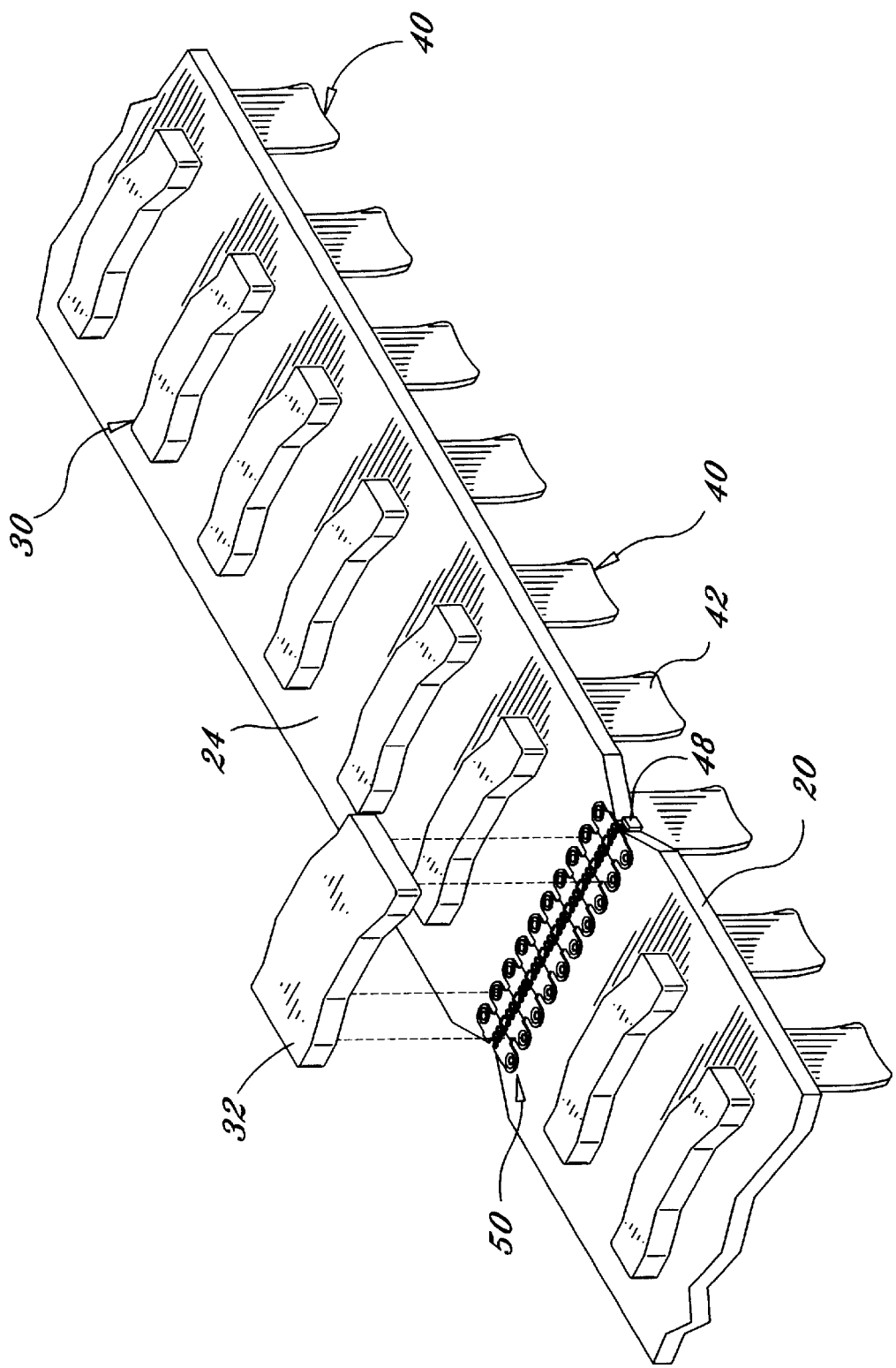
FIG. 8 is an upper perspective view of the present invention with the pair of gripping members exploded.

As shown in FIGS. 2, 3 and 6 of the drawings, one of the inner members 40 includes apertures 26 that correspond with apertures 26 within the endless rubber track 20 and the brackets 52. The inner member 40 partially engages each of the distal ends of the endless rubber track 20. As best shown in FIG. 4 of the drawings, a pair of the gripping members 30 preferably are attached about the outer surface 24 of the endless rubber track 20 adjacent to one another forming a single structure when attached to the inner member 40 opposite of the endless rubber track 20.

In an alternative embodiment shown in FIGS. 15 through 18 of the drawings, a pair of outer plates 60 are attached to the distal ends of the track 20 upon the outer surface 24. In addition, a pair of inner plates 70 are attached to the distal ends of the track 20 upon the inner surface 22 for providing increased strength to the distal portions of the track 20 having two ends. The plates 60, 70 may be attached directly to the track 20 by fasteners 46, adhesive, chemical bonding process, vulcanization, or any combination thereof. The plates 60, 70 including apertures 26 within that are aligned with one another for receiving the elongate fasteners 46 that extend through the inner member 40 and the connecting member 32 thereby retaining the distal ends of the track 20 adjacent to one another. The connecting member 32 is preferably broad enough to cover both of the outer plates 60 when attached. As further shown in FIG. 16 of the drawings, one or more support straps 80 may be attached to the fasteners 46 extending through the inner plates 70 and extend to the next inner member 40 wherein the distal end of the straps 80 are secured about the fasteners 46 extending through the next inner member 40 for providing increased support to the distal portions of the track 20 during usage. It can be appreciated that the straps 80 may be utilized independently of the plates 60, 70.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An endless track system, comprising:
   an endless track having an inner surface and an outer surface;
   a plurality of inner members attached to said inner surface of said endless track formed for receiving tires of a tractor;
   a plurality of gripping members attached to said outer surface of said endless track having a length less than a width of said endless track; and
   a plurality of fasteners that extend through said inner members and said endless track and engaged within said gripping members;

wherein said plurality of gripping members are attached transversely to said outer surface of said endless track;

wherein said plurality of gripping members are comprised of a rigid center member and an outer coating surrounding said center member;

wherein said outer coating is comprised of a resilient material;

wherein said outer coating is comprised of a plastic material;

wherein said gripping member has a center portion transversely to said endless track and a pair of opposing end sections extended at an angle with respect to said center portion.

2. The endless track system of claim 1, wherein said plurality of fasteners are threadably engaged within said gripping members.

3. The endless track system of claim 1, wherein said gripping member is shorter in length than a width of said endless track.

4. An endless track system, comprising:

an endless track having an inner surface and an outer surface;

a plurality of inner members attached to said inner surface of said endless track formed for receiving tires of a tractor;

a plurality of gripping members attached to said outer surface of said endless track having a length less than a width of said endless track; and a plurality of fasteners that extend through said inner members and said endless track and engaged within said gripping members;

wherein said plurality of gripping members are attached transversely to said outer surface of said endless track;

wherein said gripping member has a center portion transversely to said endless track and a pair of opposing end sections extended at an angle with respect to said center portion.

5. The endless track system of claim 4, wherein said gripping member is shorter in length than a width of said endless track.

6. The endless track system of claim 4, wherein said endless track is a solid track structure.

7. The endless track system of claim 4, wherein said endless track has a pair of opposing distal ends connected by a connecting structure.

8. The endless track system of claim 7, wherein said connecting structure is comprised of a plurality of brackets secured to said distal ends and a connecting shaft, wherein said connecting shaft is extendable within said plurality of brackets to retain said distal ends together.

9. The endless track system of claim 8, wherein one of said plurality of inner members is attached about said distal ends of said endless track.

10. The endless track system of claim 9, wherein said one of said plurality of inner members includes a locking member extending and retaining said connecting shaft within said brackets.

11. The endless track system of claim 10, wherein said connecting shaft includes a flanged end.

12. An endless track system, comprising:

a track having an inner surface, an outer surface, a first end, and a second end opposite of said first end;

a connecting structure for connecting said first end and said second end for forming an endless track structure;

a plurality of inner members attached to said inner surface of said track formed for receiving tires of a tractor;

a plurality of gripping members attached to said outer surface of said track; and a plurality of fasteners that extend through said inner members and said endless track and engaged within said gripping members;

wherein said connecting structure is comprised of:

a pair of outer plates secured to said first end and said second end adjacent said outer surface of said track;

a pair of inner plates secured to said first end and said second end adjacent said inner surface of said track opposite of said outer plates; and a connecting member formed for engaging said pair of outer plates and being fastened directly to one of said plurality of inner members.

13. The endless track system of claim 12, wherein said connecting member is connected to one of said plurality of inner members by a plurality of fasteners.

14. The endless track system of claim 12, wherein said outer plates and said inner plates are attached to said track by a chemical bonding process.

15. The endless track system of claim 12, including at least one support strap attached to said track adjacent said first end and said second end extending to the nearest inner member.

* * * * *